United States Patent [19]

Danforth et al.

[11] Patent Number: 4,857,147

[45] Date of Patent: Aug. 15, 1989

[54] METHOD OF COMPOSITE PART FABRICATION

[75] Inventors: R. L. Danforth, Missouri City; W. P. Gergen, Houston, both of Tex.; J. A. Neate, Niles, Mich.

[73] Assignee: Shell Oil Company, Houston, Tex.

[21] Appl. No.: 169,715

[22] Filed: Mar. 18, 1988

[51] Int. Cl.$^4$ ............ D21F 11/00; D21H 5/18; D21H 3/40; D21B 3/00

[52] U.S. Cl. .................. 162/156; 162/157.3; 162/168.1; 528/392

[58] Field of Search ............ 162/123, 145, 146, 158, 162/168.1, 169, 206, 224, 225, 156, 157.3; 427/385.5; 528/392; 560/24, 103, 243; 585/510, 511; 264/108

[56] References Cited

U.S. PATENT DOCUMENTS

| | | |
|---|---|---|
| 1,623,631 | 4/1927 | Mattison . |
| 3,157,566 | 11/1964 | Brafford ..................... 162/146 |
| 3,271,239 | 8/1966 | Hornbostel ................. 162/169 |
| 3,661,707 | 5/1972 | Emery et al. ............... 162/392 |
| 4,426,470 | 1/1984 | Wessling et al. ............ 524/35 |
| 4,448,640 | 5/1984 | Brault et al. ................ 162/218 |
| 4,599,476 | 7/1986 | Drent ......................... 585/511 |
| 4,612,251 | 9/1986 | Fredenucci et al. .......... 428/511 |
| 4,645,565 | 2/1987 | Vallee et al. ................ 162/123 |
| 4,740,625 | 4/1988 | Drent ......................... 528/392 X |

FOREIGN PATENT DOCUMENTS 1263812 8/1969 United Kingdom .

Primary Examiner—Michael Lusignan

[57] ABSTRACT

A method is disclosed for the formation of three dimensional composite articles by use of an aqueous slurry containing thermoplastic powder. The slurry is retained by a rotating wheel that is capable of dewatering and drying the slurry sufficiently within molds carried by the wheel so as to dimensionally stabilize the three dimensional composite prior to its release from the wheel. The thermoplastic powder used in the process of the present invention has a specific gravity greater than 1, and therefore mixes homogeneously with the other components of the aqueous slurry so as to yield a composite having similar mechanical properties across its entire cross section.

4 Claims, 1 Drawing Sheet

METHOD OF COMPOSITE PART FABRICATION

BACKGROUND OF THE INVENTION

The present invention relates to the manufacture of a material comprising a fiber reinforced thermoplastic resin composite, the material having a three dimensional non-planar form. The material is malleable, particularly by molding, stamping or heat shaping, into the desired final shape of an article of manufacture.

Fiber reinforced thermoplastic resin composites are a rapidly developing materials area. A basic advantage of thermoplastic composites over the thermosets is that they require no cure and can be shaped into articles by economic, high speed mass production methods.

One production method is to initially form, by the use of an aqueous slurry method well known to the art, a sheet having fibers and thermoset and/or thermoplastic powders interstitially mixed therein. The sheet is thereafter dewatered and dried, and thereafter formed into a three-dimensional article by stamping and/or heat forming operations.

For example, U.S. Pat. No. 4,645,565, assigned to Arjomarei-Prioux, teaches the manufacture of a material in sheet form wherein the sheet is prepared by a paper making technique. The sheet fabricated by this method comprises from 20 to 95% of reinforcing fibers and from 80 to 5% of thermoplastic resin in powder form forming the basic mixture and may furthermore include from 5 to 25% of a polyolefin pulp, from 5 to 30% of a binding agent, and from 0.2 to 10% of at least one flocculating agent.

U.S. Pat. No. 4,426,470, issued Jan. 17, 1984 to the Dow Chemical Company, also addresses the preparation of a reinforced polymer composite sheet having a uniform mix of fiber, polymer and binder wherein the sheet is prepared by forming dilute aqueous slurries of a solid heat fusible organic polymer, a reinforcing material and a bound charge latex binder.

U.S. Pat. No. 4,612,251, also assigned to Arjomarei-Prioux, issued Sept. 16, 1986, also teaches the fabrication of a sheet prepared according to a paper making process from a composition comprising about 45 to 140 parts by dry weight of a fibrous mixture, about 30 to 90 parts by dry weight of cellulosic fibers, and 15 to 50 parts by dry weight of mineral fibers per 100 parts by dry weight of a latex binder.

Great Britain Pat. No. 1,263,812, published Feb. 16, 1972, assigned to Wiggins-Teape Research and Development Ltd., teaches the fabrication of moldable sheet material by forming a paste by thoroughly mixing a natural or synthetic polymeric particulate solid with a binder, preparing a fibrous pulp, preparing a furnish by thoroughly mixing the paste with the fibrous pulp in a ratio by weight of solids of between 25% paste to 75% fiber and 75% paste to 25% fiber, draining the furnish on a foraminous screen, and therafter drying the furnish.

Unfortunately, the above patents merely teach the manufacture of a substantially planar two dimensional sheet which thereafter must be molded to form an article of the desired shape. The molding process usually involves the use of a stamping press, wherein the fibers located around the edges of the article or the sides thereof are damaged due to their abrupt displacement from an initially planar orientation. As a consequence, the fiber length in practical thermoplastic composite articles originally formed from sheets is usually less than 1 mm. Such short fibers understandably provide only for minimal reinforcement.

A manufacturing process that yields articles having improved reinforcement properties initially positions cellulosic fibers in their final "three dimensional" location prior to the stamping operation. The cellulosic fibers, (along with any thermoset and/or thermoplastic resin powders mixed therein), are carried by an aqueous slurry and deposited in their approximate final orientation on the surface of a three dimensional mold having a porous forming surface. The cellulosic fibers and powder particles are thereafter dewatered and dried prior to being stamped into their final orientation. Since the cellulosic fibers have already been approximately positioned in their final orientation, the stamping operation does not break a significant number of the cellulosic fibers.

Such a process may be studied in U.S. Pat. No. 3,157,566 or U.S. Pat. No. 3,271,239, wherein the cellulosic fibers and lesser amounts of certain thermoplastic resin particles are deposited by an aqueous medium on a three dimensional male and/or female mold.

Such a process would probably be inoperative if used to form a thermoplastic composite three dimensional article if the thermoplastic material, supplied to the tank in the form of a powder, were to have a specific gravity less than 1. The thermoplastic powder would tend to float upon the surface of the tank with subsequent powder rich areas being formed within the three dimensional composite structure. Unnecessarily complex binders and flocculating agents would have to be incorporated within the slurry to prevent the formation of articles having stratified reinforcing fiber locations.

A process need be developed wherein by the proper selection of thermoplastic materials a thermoplastic composite three dimensional article may be formed having homogeneous material properties throughout its entire cross section.

SUMMARY OF THE INVENTION

The method of the present invention comprises the steps of forming a dilute aqueous slurry of from about 20% to about 60% by weight of heat fusible organic polymer particles, wherein the particles have a specific gravity greater than 1. Additionally, the slurry contains from about 40% to about 80% by weight of a reinforcing material selected from the group consisting of chopped glassfiber water dispersible bundles coated with a hydrophilic silane, chopped aramid bundles, or chopped carbon fiber bundles, each bundle having a length of from about 3 mm to about 9 mm, the above percentages being by weight. In the preferred embodiment demineralized water is used as the aqueous medium.

The dilute aqueous slurry is then collected on a non-planar surface moving relative to the slurry, in a preferred embodiment the surface forming a portion of a rotating wheel having its lower portion submerged within the slurry. The collected particles and reinforcing material carried upwardly by the rotating wheel away from the slurry are then dewatered and dried by application of vacuum and heat.

By use of a thermoplastic powder having a specific gravity greater than 1 the powder may easily submerge within the water and the fibers and the thermoplastic powder used to form the aqueous slurry may be blended together with efficient interstitial distribution of the powder within the fibers, so as to insure a composite three dimensional part have a uniform mechanical properties across its cross section.

By use of available glass, aramid, and/or carbon fibers the part will have improved mechanical properties beyond those obtainable from cellulosic fibers.

It is therefore an object of the present invention to form a three dimensional organic polymer composite having uniform material properties.

It is a feature of the present invention to use a thermoplastic powder having a specific gravity greater than 1.

These and other features, objects and advantages of the present invention will become apparent from the following detailed description wherein reference is made to the FIGURE in the accompanying drawing.

IN THE DRAWINGS

FIG. 1 is a schematic representation of the apparatus used to manufacture a three dimensional thermoplastic composite.

DESCRIPTION OF THE PREFERRED EMBODIMENT

Figure 1:
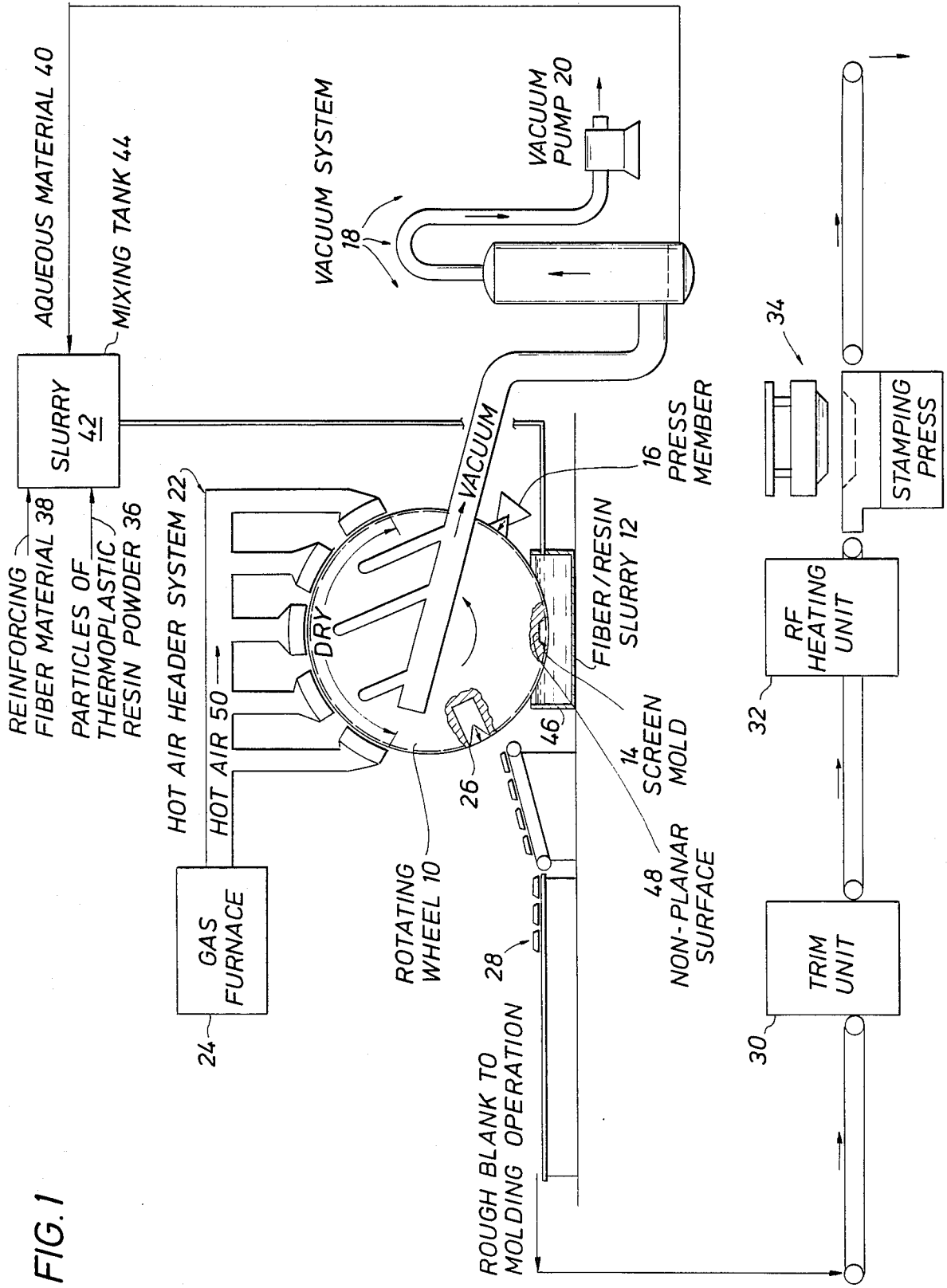

Referring now to FIG. 1 a rotating wheel 10 is shown moving in a counter-clockwise direction through a fiber/resin slurry 12 whereby through the application of vacuum the fiber/resin slurry becomes drawn towards and thereafter shaped in a three dimensional manner to a plurality of screen molds 14, for example as described in U.S. Pat. No. 4,448,640, issued May 15, 1984, or U.S. Pat. No. 3,661,707, issued May 9, 1972, wherein the screen molds 14 are carried by a rotating wheel.

As disclosed in these '640 and '707 patents the article formed on the three dimensional mold is transported away from the aqueous slurry and into the dewatering and drying operations by rotation of the wheel. The wheel has porous indentations that roughly shape the fibrous material contained within the tank to the dimensions of the desired article. The invention of the '640 patent notably applies to the formation of egg boxes.

Press member 16 assists in compacting the fiber/resin slurry accumulated within the screen mold, as is taught in the '707 patent. The slurry is further held in place within the mold 14 by application of vacuum by a vacuum system 18 typically having a vacuum pump 20 placed in communication with the screen mold 14, as is well known within the art.

A hot air header system 22 supplies hot air typically from a gas furnace 24 to dry the fiber/resin slurry. Ejection means 26 such as a hydraulically-driven piston assist in pushing the substantially dried and dewatered composite articles 28 from the rotating wheel 10. These composite articles 28 are subsequently passed through a trim unit 30, radio frequency heating unit 32, and a stamping press 34 to trim and mold the composite articles into their final shape.

The fiber/resin slurry 12 in a preferred embodiment is prepared using the following materials. The thermoplastic resin powder 36 comprises a linear alternating polymer of an ethylene (46 mol%)-propylene (4 mol%) carbon monoxide (50 mol%) polyketone terpolymer having a melting point of 221°, which has been mechanically reduced to a powder wherein the particles forming the powder have a maximum diameter of 500 microns.

The powder is stabilized with 0.2% weight of Irganox 1010. The powder, having a specific gravity greater than 1, mixes easily with the other portions of the slurry so as to yield a homogeneous deposition of particles and fibers 38 on the screen mold 14. The powder therefore is preferred over other thermoplastic powders having specific gravities less than 1, such as nylon polypropylene.

The dilute aqueous slurry that is formed has from about 70 to about 95% of heat fusible organic polymer particles, having a specific gravity greater than 1. The dilute aqueous slurry also contains from about 5 to about 30% of a reinforcing material, the above percentages being by volume. The reinforcing material in a preferred embodiment may be selected from the group consisting of chopped glass fiber water dispersible bundles coated with a hydrophilic silane, chopped aramid bundles, or chopped carbon fiber bundles, each bundle having a length of from about 3 mm to about 9 mm These fibers 38, thermoplastic resin powder 36, and aqueous material 40 such as demineralized water, are mixed into a slurry 42 within mixing tank 44.

The slurry 42 is then delivered to the slurry holding tank 46 located beneath the rotating wheel 10. A portion of the particles 36 and a portion of the fibers 38 are then collected on the non-planar moving surface 48 of the screen mold 14. Pressing of the slurry retained within the screen mold 14 by the press member 16, and application of vacuum by the vacuum system 18, removes a substantial portion of the water from the slurry. Application of hot air 50 from the hot air header system 22 to the particles 36 and fibers 38 further insures that the particles and fibers are dried sufficiently so as to remain dimensionally stabilized upon ejection from the rotating wheel 10 by the ejection means 26.

It is now desirable to review the background and development of the thermoplastic polymer that is necessary for the successful formation of the three dimensional composite.

The polymers which form the material of the powder particles 36 of the invention are those linear alternating polyketones produced from carbon monoxide and at least one ethylenically unsaturated hydrocarbon. Suitable ethylenically unsaturated hydrocarbons for production of polyketones through polymerization with carbon monoxide are hydrocarbons of from 2 to 20 carbon atoms inclusive, preferably of up to 10 carbon atoms inclusive, and are aliphatic including ethylene and other alpha-olefins such as propylene, butene-1, isobutylene, octene-1 and dodecene-1, or are arylaliphatic containing an aryl substituent on an otherwise aliphatic molecule, particularly an alpha-olefin containing an aryl substituent on a carbon atom of the ethylenic unsaturation. Illustrative of this latter class are styrene, p-methylstyrene, m-ethylstyrene and p-propylstyrene. Preferred polyketone polymers for use in the powder particles 36 of the invention are copolymers of carbon monoxide and ethylene or terpolymers of carbon monoxide, ethylene and a second alpha-olefin of 3 or more carbon atoms, particularly propylene.

Of particular interest are the polyketones of molecular weight from about 1000 to about 200,000 especially those polymers of molecular weight from about 10,000 to about 50,000 and containing substantially equimolar quantities of carbon monoxide and ethylenically unsaturated hydrocarbon.

A method of producing polyketone polymers which is now becoming conventional is to contact the carbon monoxide and the ethylenically unsaturated hydrocarbon(s) under polymerization conditions in the presence of a catalyst formed from a metal compound of palladium, cobalt or nickel, an anion of a non-hydrohalogenic acid having a pKa less than about 6, preferably less than about 2, and certain bidentate ligands of nitrogen or of phosphorus, arsenic or antimony. Although the scope of the polymerization process is extensive, for purposes of illustration of a preferred method of producing the polyketone polymer, the metal compound is palladium acetate, the anion is the anion of trifluoroacetic acid or para-toluenesulfonic acid and the bidentate ligand is selected from 1,3-bis(diphenylphosphino)propane and 1,3-bis[di(2-methoxyphenyl)phosphino]propane.

Polymerization is typically carried out at elevated temperature and pressure in the gaseous phase in the substantial absence of reaction diluent or in the liquid phase in the presence of a reaction diluent such as a lower alkanol, e.g., methanol or ethanol. Suitable reaction temperatures are from about 20° C. to about 150° C. with preferred temperatures being from about 50° C. to about 125° C. The reaction pressure will typically be from about 1 bar to about 200 bar, preferably from about 10 bar to about 100 bar. The reactants and catalyst are contacted by conventional methods such as shaking or stirring and subsequent to reaction the polymer product is recovered as by filtration or decantation. The polymer product will, on occasion, contain metal or other residues of the catalyst which are removed, if desired, by treatment of the polymer product with a complexing agent or solvent which is selective for the residues. Production of this class of polymers is illustrated, for example, by copending U.S. patent application Ser. No. 930,468, filed Nov. 14, 1986.

The physical properties of the polymer used to form the powder particles of the invention will be in part determined by the molecular weight of the polymer, whether the polymer is a copolymer or terpolymer and which unsaturated hydrocarbons have been employed in its production. Suitable linear alternating polyketones for use in the invention have limiting viscosity numbers (LVN) as measured in m-cresol at 60° C., using a standard capillary viscosity measuring device, in the range of about 0.5 to about 10 LVN, more preferably from about 0.8 to about 4 LVN and most preferably from about 1.1 to about 2.5. Typical melting points of the polyketone polymers are from about 175° C. to about 300° C., more frequently from about 210° C. to about 260° C. The structure of the polymer in the preferred modifications is that of a linear alternating polymer of units of carbon monoxide and ethylene and carbon monoxide and any second ethylenically unsaturated hydrocarbon if present. The preferred polyketone polymers contain substantially one carbon monoxide moiety for each moiety of unsaturated hydrocarbon. When terpolymers are produced from carbon monoxide, ethylene and a second ethylenically unsaturated hydrocarbon, i.e., an alpha-olefin of at least 3 carbon atoms such as propylene, there will be at least about 2 units incorporating a moiety of ethylene per unit incorporating a moiety of the second ethylenically unsaturated hydrocarbon. Preferably, there are from about 10 to about 100 units incorporating a moiety of ethylene per unit incorporating a moiety of the second ethylenically unsaturated hydrocarbon. The preferred class of polyketone polymers is therefore characterized by a polymer chain of the formula

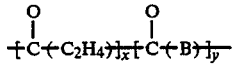

wherein B is the moiety obtained by the polymerization of the second ethylenically unsaturated hydrocarbon of at least 3 carbon atoms through the ethylenic unsaturation. By way of further illustration, when the second ethylenically unsaturated hydrocarbon is propylene, the B moiety will be

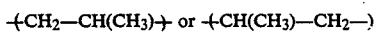

depending upon the stereochemistry of the polymerization. The polyketone terpolymers of the invention may contain both types of B moiety randomly occurring along the polymer chain. The

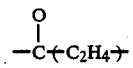

units and the

units will also occur randomly throughout the polymer chain although the ratio of y:x in the above formula I will be no more than about 0.5. In an alternative embodiment of the polymer, the polymer comprises copolymers of carbon monoxide and ethylene without the presence of a second ethylenically unsaturated hydrocarbon. In this case the polymers are represented by the above formula I wherein y=0. When y is other than 0, i.e. terpolymers are employed, ratios of y:x from about 0.01 to about 0.1 are preferred.

The linear alternating polyketones described by the above formula I will have end groups or "caps" which depend upon the particular components present during polymerization and whether and how the polymer is processed during any subsequent purification. The precise nature of such end groups or "caps" is not critical with regard to overall properties of the polymer, however, and the polymeric polyketones are fairly depicted through use of the polymer chain as depicted above.

A possible composition of the polymer used to form the powder particles is further illustrated by the following Illustrative Embodiment which should not be construed as limiting.

Illustrative Embodiment I

A linear alternating terpolymer of carbon monoxide, ethylene and propylene, Sample A, was prepared in the presence of a catalyst formed from palladium acetate, the anion of trifluoroacetic acid, and 1,3-bis(diphenylphosphino)propane. Sample A polymer had a melting point of 222° C. and a limiting viscosity number (LVN) of 1.76 measured at 60° C. in m-cresol.

Illustrative Embodiment II

Sample B is prepared by selecting reinforcing material from the group consisting of chopped glassfibre water dispersable bundles coated with a hydrophilic silane, chopped aramid bundles, or chopped carbonfibre bundles, each bundle having a length of from about 3 mm to about 9 mm After the desired reinforcing material is selected, a dilute aqueous slurry is formed having from about 20% to about 60% by weight percent of heat fusible polyketone polymer particles, the particles having a specific gravity greater than one and having a maximum diameter of 500 microns, and from about 40% to about 80% by weight of the selected reinforcing material. A portion of the particles and a portion of the reinforcing material are then collected on a non-planar surface moving relative to said slurry. The collected particles and reinforcing material are then dewatered and dried. After being dried the particles, if required, are scintered sufficiently to dimensionally stabilize the composite prior to further forming processes.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawing and referred to in the foregoing description are illustrative only and are not intended as limitations on the scope of the invention.

We claim as our invention:

1. A method for making a composite, wherein said composite is capable of being formed into a reinforced polymer article, said method comprising the steps of:

forming a dilute aqueous slurry of from about 20 to about 40% percent by weight of heat fusible polyketone polymer particles, having a specific gravity greater than one, and from about 80 to about 60% percent of a reinforcing material, the percentages being by weight;

collecting a portion of the particles and a portion of the reinforcing material on a non-planar surface moving relative to said slurry;

dewatering said collected particles and reinforcing material; and drying said collected particles and reinforcing material.

2. The method of claim 1 further including, prior to the step of forming said dilute aqueous slurry, the step of:

selecting said reinforcing material from the group consisting of chopped glassfibre water dispersable bundles coated with a hydrophilic silane, chopped aramid bundles, or chopped carbonfibre bundles, each bundle having a length of from about 3 mm to about 9 mm.

3. The method of claim 1 further including, subsequent to the step of drying said collected powders and reinforcing material, the step of scintering said particles sufficiently to dimensionally stabilize said composite.

4. The method of claim 1 further including, prior to the step of forming said dilute aqueous slurry, the step of selecting polyketone polymer polymers having a maximum diameter of 500 microns.

* * * * *